(12) United States Patent
Yamashita

(10) Patent No.: US 7,403,655 B2
(45) Date of Patent: Jul. 22, 2008

(54) MOVING PICTURE SYSTEM AND MOVING PICTURE EXTRACTION METHOD

(75) Inventor: Shinji Yamashita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 740 days.

(21) Appl. No.: 10/934,527

(22) Filed: Sep. 7, 2004

(65) Prior Publication Data

US 2005/0055711 A1   Mar. 10, 2005

(30) Foreign Application Priority Data

Sep. 9, 2003   (JP)   ............................. 2003-317321
Aug. 25, 2004   (JP)   ............................. 2004-245688

(51) Int. Cl.
*G06K 9/34*   (2006.01)

(52) U.S. Cl. .................................................... 382/173

(58) Field of Classification Search ................. 382/173, 382/190, 298, 305; 348/14.1, 14.15, 700, 348/169; 386/52, 111; 345/474; 707/1, 707/104.1; 715/723

See application file for complete search history.

(56) References Cited

U.S. PATENT DOCUMENTS

| | | | |
|---|---|---|---|
| 4,982,286 A | 1/1991 | Iwabuchi et al. | |
| 5,111,293 A | 5/1992 | Yamashita | |
| 5,177,649 A | 1/1993 | Iwakami et al. | |
| 5,544,176 A | 8/1996 | Fujii et al. | |
| 5,729,828 A | 3/1998 | Goda et al. | |
| 6,118,606 A | 9/2000 | Sasaki et al. | |
| 6,144,375 A * | 11/2000 | Jain et al. | 715/500.1 |
| 6,961,446 B2 * | 11/2005 | Imagawa et al. | 382/103 |
| 7,072,574 B2 * | 7/2006 | Suzuki | 386/111 |
| 7,231,088 B2 * | 6/2007 | Echigo et al. | 382/225 |

FOREIGN PATENT DOCUMENTS

| | | |
|---|---|---|
| EP | 0 997 908 | 5/2000 |
| EP | 1 271 359 | 1/2003 |
| JP | 05-012406 | 1/1993 |
| JP | 09-035419 | 2/1997 |
| JP | 2001-142896 | 5/2001 |

OTHER PUBLICATIONS

"Post Your Movies to a Web Site with Windows Movie Maker 2", XP-002310179, (Jan. 7, 2003), located at URL:www.microsoft.com/windowsxp/using/moviemaker/expert/postmovies.mspx> (retrieved on Nov. 24, 2004).

* cited by examiner

*Primary Examiner*—Jose L Couso
(74) *Attorney, Agent, or Firm*—Fitzpatrick, Cella, Harper & Scinto

(57) ABSTRACT

A client acquires the size of the moving picture, decides a segment of a moving picture to be extracted from the original moving picture and extracts the moving picture of the segment decided. The client uploads, to a server on a network, the moving picture extracted from a moving picture file.

14 Claims, 9 Drawing Sheets

FIG. 1
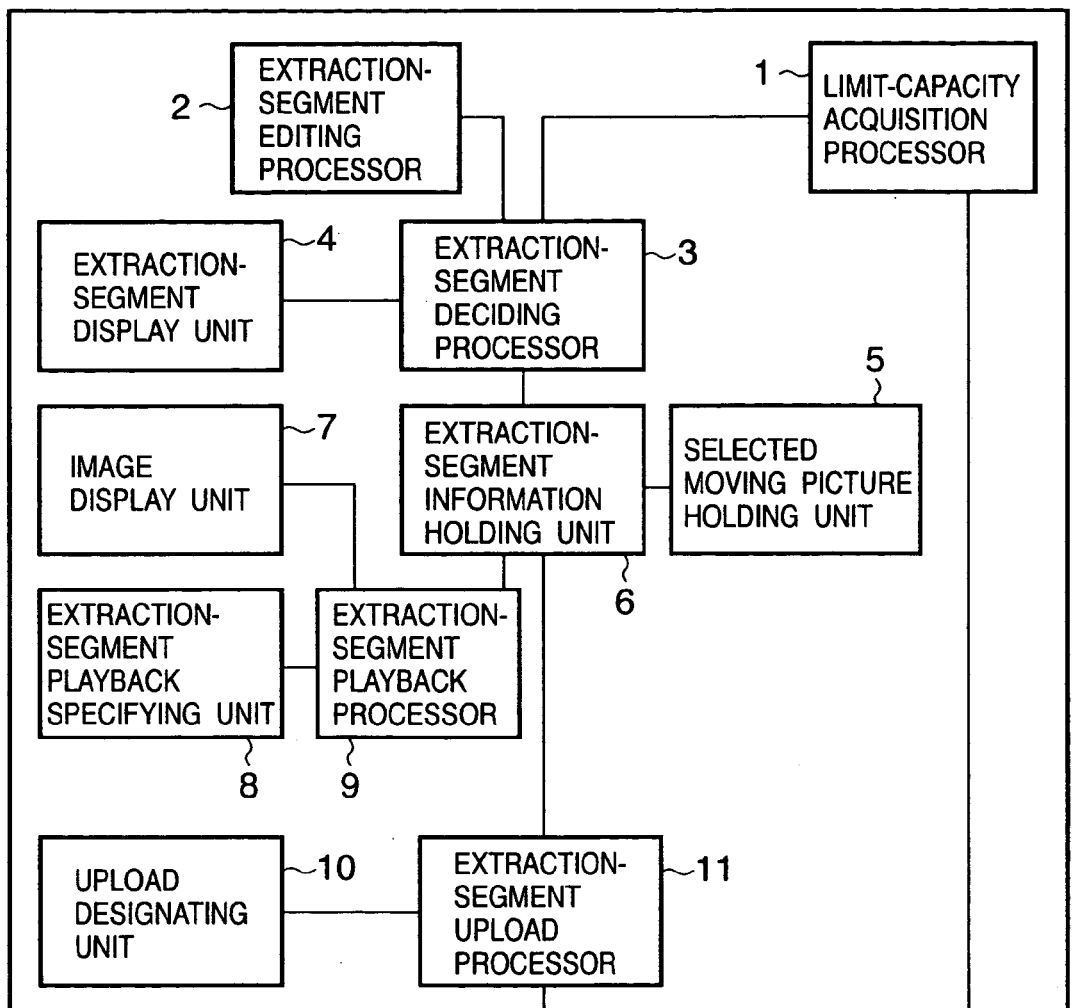
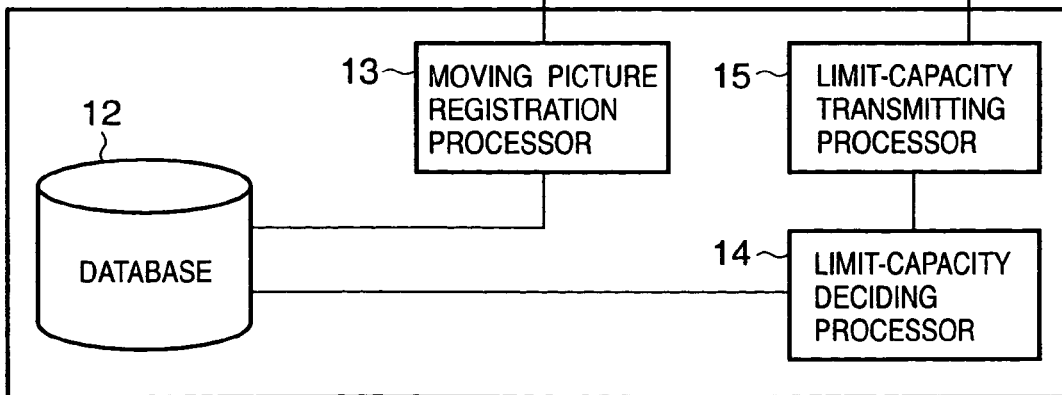

EXAMPLE OF STARTING-POSITION EDITING BY USER

EXAMPLE OF RESULT OF DISPLAY AFTER ADJUSTMENT OF MOVING PICTURE SEGMENT

MOVING PICTURE SYSTEM AND MOVING PICTURE EXTRACTION METHOD

FIELD OF THE INVENTION

This invention relates to a technique for extracting a moving picture of a desired size from a moving picture file.

BACKGROUND OF THE INVENTION

The rapid development of digital still cameras and digital video cameras and the like in recent years has been accompanied by increasing opportunities for individuals to handle moving pictures on a personal computer. Further, owing to the spread of the Internet, there are greater opportunities for sending moving pictures to acquaintances by attaching them to e-mail or for uploading them to sites that provide an Internet-based moving picture sharing service in order to disclose the moving pictures to third parties.

Under these circumstances, there are many instances where a limitation is imposed upon the uploadable size of moving pictures in the case of the conventional Internet-based moving picture sharing services. For this reason, the user follows a procedure according to which an original moving picture file is compressed or has unnecessary portions removed by a client application in such a manner that the size of the moving picture file will fall within the size limitation, after which the moving picture is subjected to editing processing and stored as a separate file, which is then uploaded.

However, the prior art described above has certain disadvantages.

Specifically, one problem is that when an original moving picture is compressed, its image quality declines.

Further, even if the user attempts to create a moving picture file by removing unnecessary portions so as to obtain a size within the size limitation by making an inference from the overall size of the original moving picture, it is difficult for the user to grasp the size of the eliminated portions and difficult to stringently achieve the desired size. Adjustments must be made a number of times to obtain the desired size. This is a troublesome procedure.

SUMMARY OF THE INVENTION

Accordingly, an object of the present invention is to allow a user to simply extract a moving picture of a limited size in a case where the size of the moving picture is limited.

According to the present invention, the foregoing object is attained by providing a method of extracting moving pictures in an information processing apparatus for extracting a moving picture of a desired size from a moving picture file, comprising: an acquisition step of acquiring size of a moving picture; a decision step of deciding an extraction segment of a moving picture to be extracted from a moving picture file, based upon the size acquired at the acquisition step; and an extraction step of extracting the moving picture of the extraction segment, which has been decided at the decision step, from the moving picture file.

Further, according to the present invention, the foregoing object is attained by providing a moving picture extraction apparatus for extracting for extracting a moving picture of a desired size from a moving picture file, comprising: acquisition means for acquiring size of a moving picture; decision means for deciding an extraction segment of a moving picture to be extracted from a moving picture file, based upon the size acquired by the acquisition means; and extraction means for extracting the moving picture of the extraction segment, which has been decided by the decision means, from the moving picture file.

Further, according to the present invention, the foregoing object is attained by providing a moving picture system comprising a client apparatus for extracting a moving picture of a desired size from a moving picture file, and a server apparatus for managing moving pictures, wherein the client apparatus includes: acquisition means for acquiring size of a moving picture; decision means for deciding an extraction segment of a moving picture to be extracted from a moving picture file, based upon the size acquired by the acquisition means; extraction means for extracting the moving picture of the extraction segment, which has been decided by the decision means, from the moving picture file; and means for uploading the moving picture, which has been extracted by the extraction means, to the server; and the server apparatus includes management means for managing a moving picture that has been uploaded from the client apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a block diagram illustrating the configuration of a system according to the present invention;

DETAILED DESCRIPTION OF THE PREFERRED EMBODIMENTS

Figure 2:
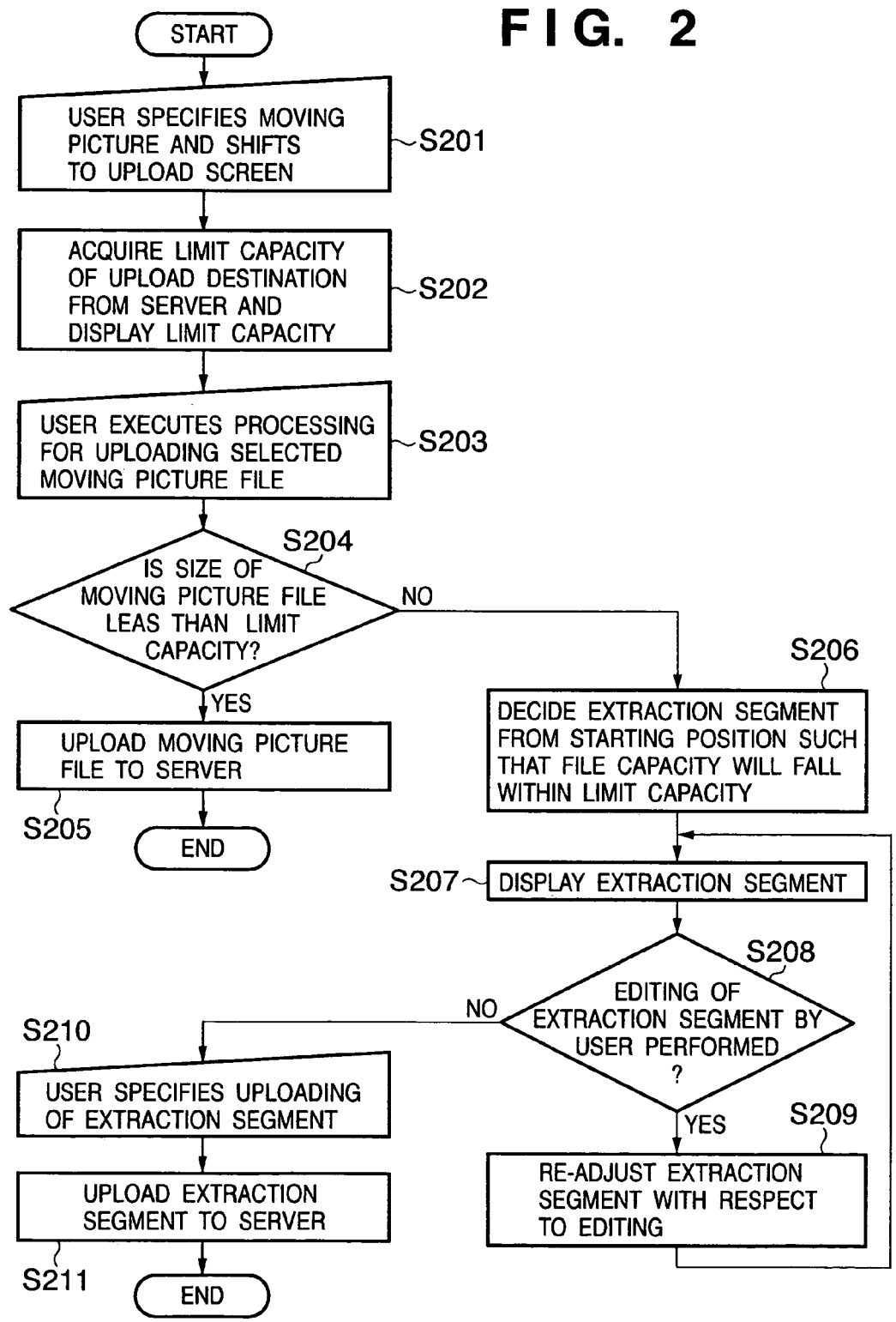
FIG. 2 is a flowchart illustrating an example of processing by a client according to the present invention.

Preferred embodiments for working the present invention will now be described in detail with reference to the drawings. It should be noted that the relative positions of the constituent parts and the display screens described in the embodiments do not limit the scope of the present invention unless it is specifically stated otherwise.

In embodiments described below, with an Internet-based moving picture sharing server system and a client application that operates in association with this server system, a user extracts a desired part of a moving picture from an original moving picture file in such a manner that the size of the moving picture will fall within a size specified by the server, and uploads the extracted moving picture file to the server.

First Embodiment

FIG. 1 is a block diagram illustrating the configuration of a system according to a first embodiment of the present invention. A client shown in FIG. 1 is an information processing terminal such as a personal computer, a PDA (Personal Digital Assistant) or mobile telephone that is connected to a server by a browser function via a network such as the Internet and uploads moving pictures. Further, the server provides a moving picture sharing service for disclosing moving pictures to multiple clients.

The client includes a limit-capacity acquisition processor 1 for acquiring, from the server that is the upload destination, the capacity of a moving picture file that is limited by the server; an extraction-segment editing processor 2 for editing an extraction segment which the user extracts from a moving picture file; an extraction-segment deciding processor 3 for adjusting and deciding the extraction segment, which has been specified by the extraction-segment editing processor 2, so as to fall within the limit capacity acquired by the limit-capacity acquisition processor 1; an extraction-segment display unit 4 for displaying the extraction segment of the moving picture file decided by the extraction-segment deciding processor 3; a selected moving picture holding unit 5 for holding a moving picture file that has been selected by the user for uploading; an extraction-segment information holding unit 6 for holding the segment information decided by the extraction-segment deciding processor 3; an image display unit 7 for presenting a display of reproduced moving pictures and displaying a frame image of a specified position; an extraction-segment playback specifying unit 8 for specifying an extraction segment of a moving picture that the user wishes to play back; an extraction-segment playback processor 9 for receiving the result specified by the extraction-segment playback specifying unit 8 and executing processing for reproducing and displaying, on the image display unit 7, the moving picture of the extraction segment held by the extraction-segment information holding unit 6 from the moving picture file held in the selected moving picture holding unit 5; an upload designating unit 10 by which the user designates uploading; and an extraction-segment upload processor 11 for receiving the result designated by the upload designating unit 10 and uploading, to the server, the segment information held in the extraction-segment information holding unit 6 from the moving picture held by the selected moving picture holding unit 5.

A server includes a database 12 for archiving a prescribed capacity of a moving picture file provided by a moving picture sharing service; a moving picture registration processor 13 for registering a moving picture file, which has been uploaded from a client, in the database 12; a limit-capacity deciding processor 14 for deciding the capacity that remains in the database 12 for storing moving pictures uploaded by the user; a limit-capacity transmitting processor 15 for transmitting the limit capacity, which has been decided by the limit-capacity deciding processor 14, to the client.

Described next will be processing whereby a user specifies a desired moving picture file from the above-described client and uploads the file to the server.

FIG. 2 is a flowchart illustrating an example of processing executed by the client according to the first embodiment. In the first embodiment, a case where VBR (Variable Bit Rate), which can automatically adjust amount of data in accordance with a scene, is adopted as the encoding scheme of a moving picture file is taken as an example.

First, at step S201, the user launches an application for handling moving pictures at the client and selects a moving picture file desired to be uploaded to the server, whereupon the display screen of the image display unit 7 is caused to shift to an upload screen. Next, at step S202, the limit-capacity acquisition processor 1 acquires from the server the limit capacity of an uploadable moving picture file and displays it on the upload screen. Specifically, the limit-capacity acquisition processor 1 issues a request to the limit-capacity transmitting processor 15 of the server and acquires the limit capacity as the response. At the server, meanwhile, the limit-capacity transmitting processor 15 requests the limit capacity from the limit-capacity deciding processor 14, and the limit-capacity deciding processor 14 responds by deciding the limit capacity based upon the amount data in the database 12 and reports this to the limit-capacity transmitting processor 15.

Next, when the user specifies uploading of the selected moving picture file at step S203, it is determined at step S204 whether the size of this moving picture file is less than the limit capacity acquired at step S202. If the size of the moving picture file is smaller, control proceeds to step S205, where the selected moving picture file is uploaded to the server.

Further, if the size of the selected moving picture file is greater than the limit capacity, control proceeds to step S206. Here the extraction-segment deciding processor 3 fixes the beginning of the selected moving picture file as a starting position and calculates an end position that will bring the capacity of the file to within the limit capacity, thereby deciding the extraction segment. The information of the extraction segment decided by the extraction-segment deciding processor 3 is held in the extraction-segment information holding unit 6.

Next, at step S207, the extraction segment decided at step S206 is displayed on the extraction-segment display unit 4 and it is so arranged that the user can edit the extraction segment. Editing of the extraction segment will be described with reference to FIG. 3.

Figure 3:
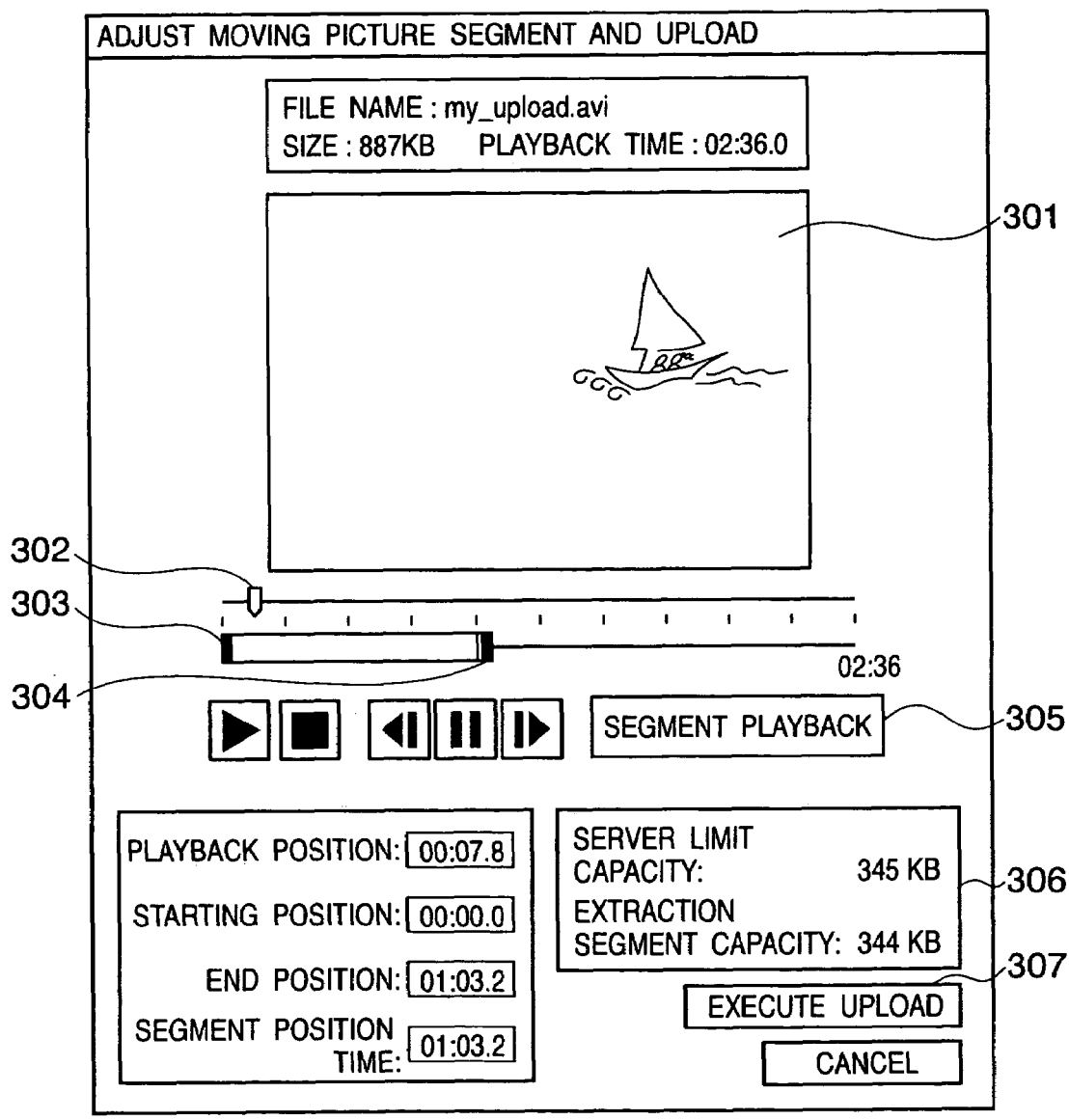
FIG. 3 is a diagram illustrating an example of a screen displayed at a step S207.

FIG. 3 is a diagram illustrating an example of the screen displayed at step S207. An area 301 in FIG. 3 is an image display area for displaying a still picture and a moving picture at a playback position for moving picture files. A part 302 is for indicating the playback position. An extraction segment has a starting position 303 and an end position 304. On this example of the screen, the user can move the extraction segment by manipulating either the starting position 303 or the end position 304, thereby making it possible to extract the desired moving picture segment. The starting position 303 and end position 304 also serve as the extraction-segment editing processor 2.

A button 305 is for specifying playback of the extraction segment and corresponds to the extraction-segment playback specifying unit 8. By pressing the button 305, a moving picture of the extraction segment is reproduced by the extraction-segment playback processor 9 and is displayed in the image display area 301. A limit-capacity display area 306 displays the limit capacity. A button 307 is for uploading the extraction segment to the server and corresponds to the upload designating unit 10.

With reference again to FIG. 2, it is determined at step S208 whether editing of the extraction segment has been performed by the user. If editing has been performed, control proceeds to step S209. Here the extraction-segment deciding processor 3 re-adjusts the extraction segment, which has been edited by the user, in such a manner that it will fall within the limit capacity.

Figure 4:
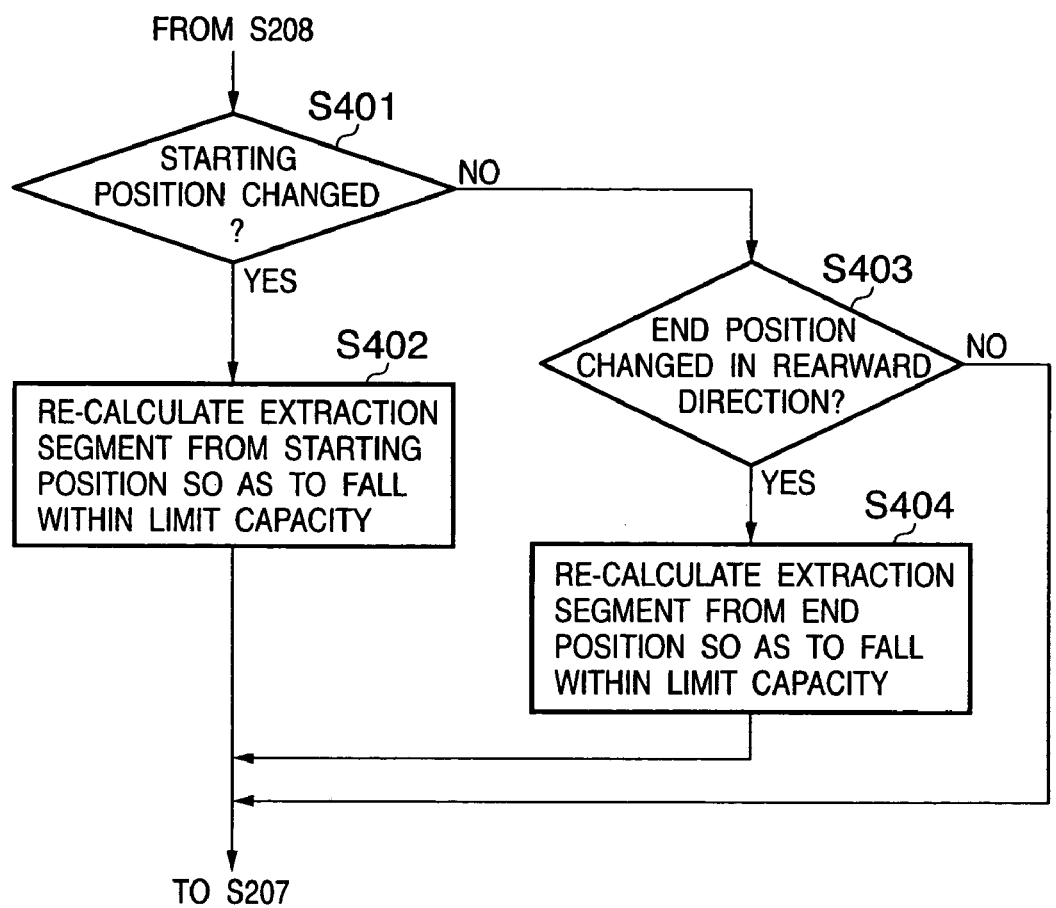
FIG. 4 is a flowchart illustrating the details of processing executed at a step S209.

FIG. 4 is a flowchart illustrating the details of processing executed at step S209. First, at step S401, it is determined whether the starting position of the extraction segment has been changed by editing processing by the user. If the determination is that the starting position of the extraction segment has been changed, control proceeds to step S402. Here the changed starting position of the extraction segment is fixed at the new starting position, the end position is calculated in such a manner that the capacity of the file will fall within the limit capacity, and the extraction segment is decided.

If it is found at step S401 that the starting position of the extraction segment has not been changed, then control proceeds to step S403, where it is determined whether the end position of the extraction segment has been changed in the rearward direction by editing processing by the user. If the determination is that the end position of the extraction segment has been changed in the rearward direction, control proceeds to step S404. Here the changed end position of the extraction segment is fixed at the new end position, the end position is calculated in such a manner that the capacity of the file will fall within the limit capacity, and the extraction segment is decided.

Figure 5A:
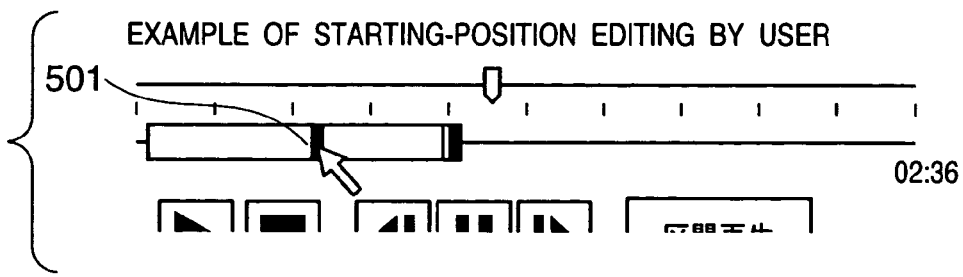
FIGS. 5A, 5B are diagrams illustrating an example of extraction-segment editing and a display screen after editing, respectively.
Figure 5B:

FIGS. 5A, 5B are diagrams illustrating an example of extraction-segment editing and a display screen after editing, respectively. FIG. 5A is a diagram illustrating a state in which the user has moved the starting position 303 of FIG. 3 to 501 to edit the extraction segment. FIG. 5B is the result of editing in FIG. 5A. This is a diagram illustrating the screen displayed at step S207 after the extraction segment has been re-adjusted so that the capacity of the moving picture file will fall within the limit capacity. The result of the re-adjustment is that the end position moves automatically to 502. Further, since the extraction segment is decided by the limit capacity, the length of time of the segment is not fixed.

With reference again to FIG. 2, if it is determined at step S208 that the user has not edited the extraction segment displayed, then control proceeds to step S210, where the user specifies uploading of the moving picture file of the extraction segment. This processing is executed by the upload designating unit 10. Then, at step S211, the result of step S210 is received and the moving picture file of the extraction segment is uploaded to the server based upon the information being held in the extraction-segment information holding unit 6 and selected moving picture holding unit 5. This processing is executed by the extraction-segment upload processor 11. Further, as a result of the processing at step S211, the moving picture of the extraction segment is transferred to the moving picture registration processor 13, where the moving picture is registered in the database 12.

According to the first embodiment as described above, when a user uploads a moving picture to the server, the user merely specifies a desired starting position or end position in accordance with the limit capacity of a server, whereby the user can simply extract a moving picture having a size that will fall within the limit capacity of the server.

Second Embodiment

A second embodiment of the present invention will now be described in detail with reference to the drawings. The first embodiment was described with regard to a case where a moving picture file is uploaded to a server on the Internet. The second embodiment, however, will be described with regard to a case where a user specifies the size of the extraction segment from an original moving picture using a lone computer without the intermediary of the Internet, extracts this portion of the moving picture and saves it as a moving picture file.

Figure 6:
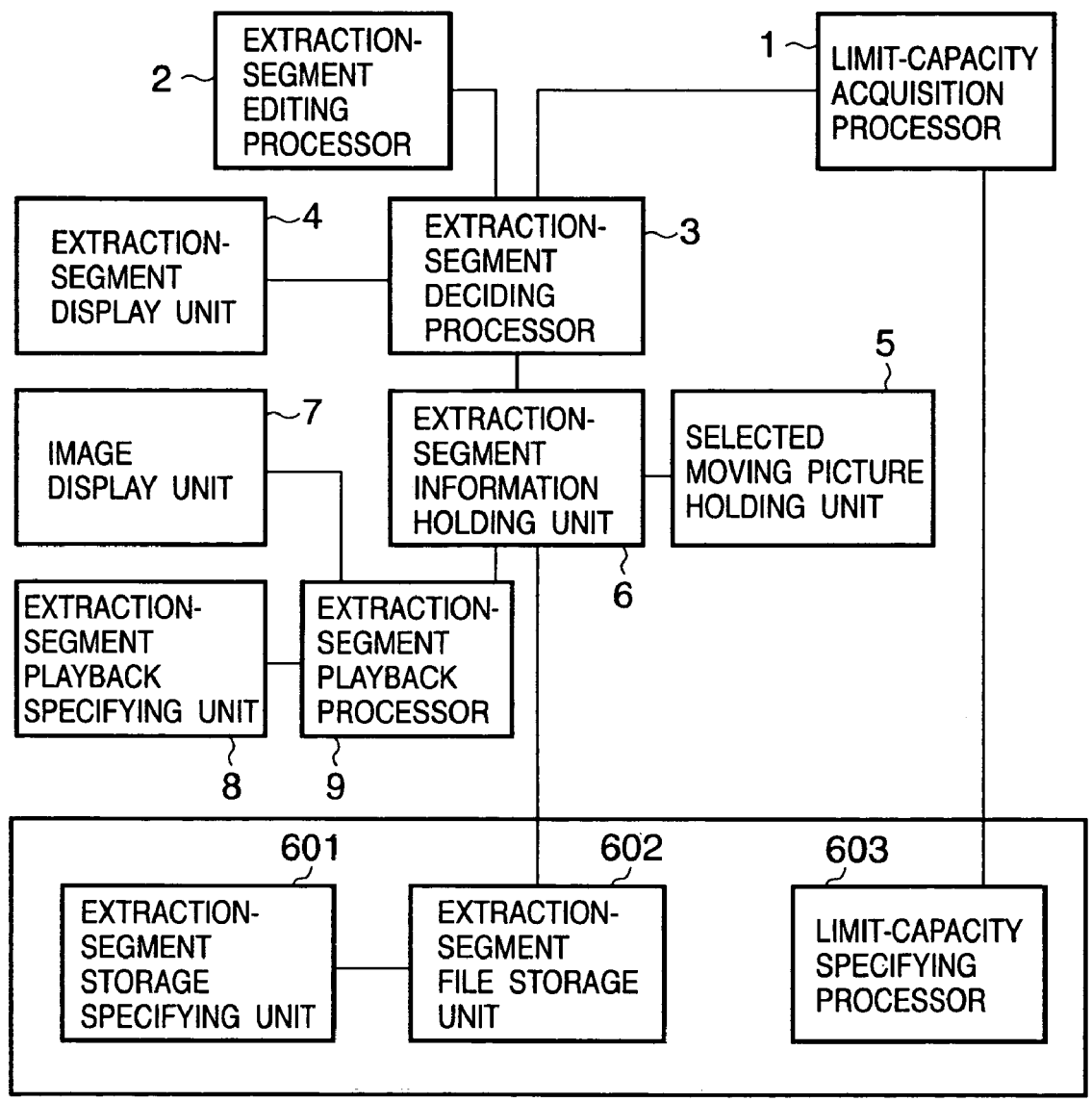
FIG. 6 is a block diagram illustrating the configuration of a system according to a second embodiment of the present invention.

FIG. 6 is a block diagram illustrating the configuration of a system according to a second embodiment of the present invention. The components 1 to 9 shown in FIG. 6 have functions similar to those of the first embodiment. However, the limit-capacity acquisition processor 1 does not acquire the limit-capacity of a moving picture file from a server; rather, it acquires the size of a moving picture file specified by a user.

In FIG. 6, the system includes an extraction-segment storage specifying unit 601 by which the user specifies that an extraction segment be stored as a moving picture file; an extraction-segment file storage unit 602 which, upon receiving the indication from the extraction-segment storage specifying unit 601, stores the extraction segment of a moving picture being held in the selected moving picture holding unit 5 in a file based upon information being held in the extraction-segment information holding unit 6; and a limit-capacity specifying processor 603 for specifying the size of a moving picture file extracted by the user.

Described next will be processing whereby a user specifies the size of an extraction segment from a moving picture file selected by the client, extracts the moving picture and stores it as a moving picture file.

Figure 7:
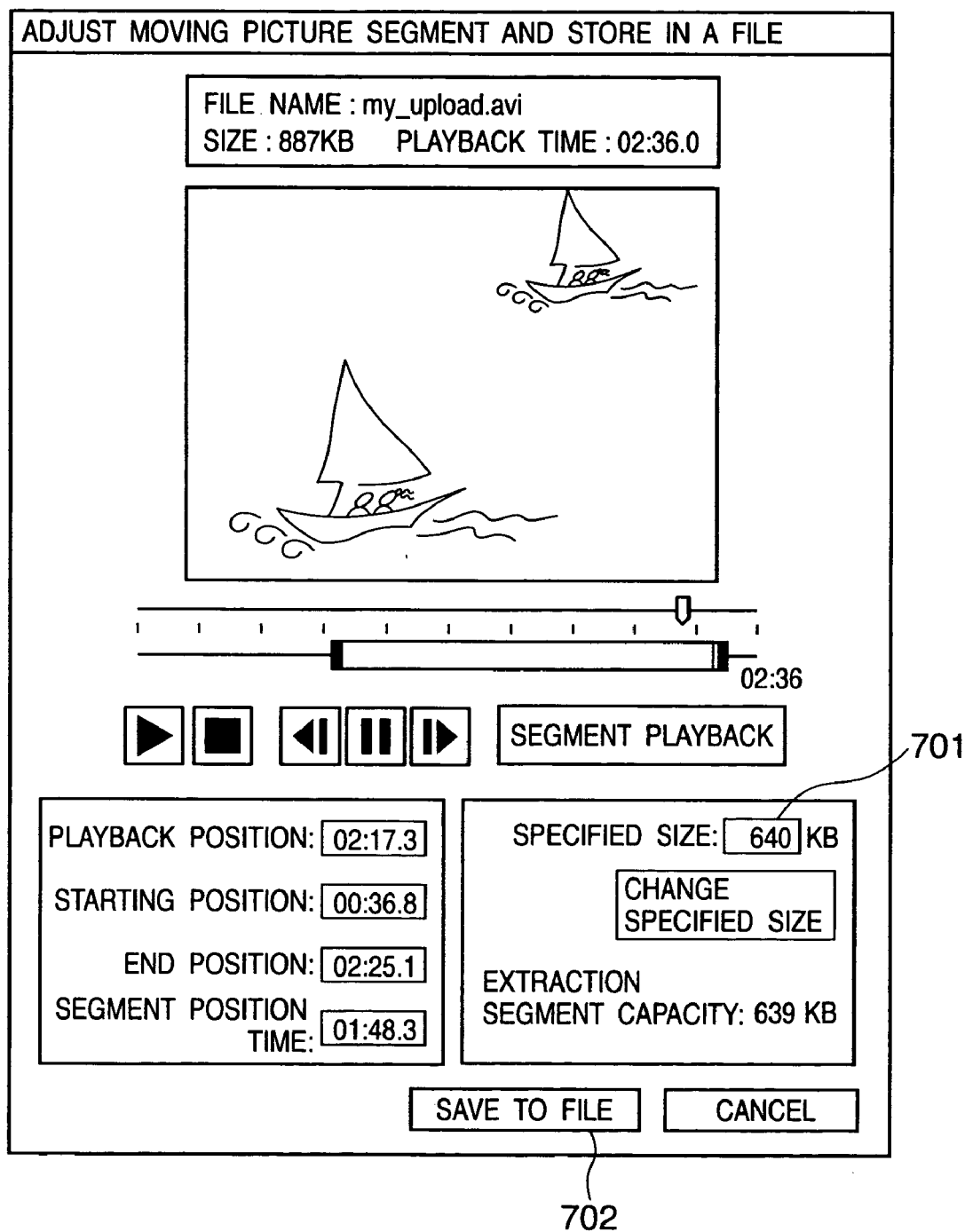
FIG. 7 is a diagram illustrating an example of a screen for specifying the size of an extraction segment and storing a moving picture of this segment in a file.

FIG. 7 is a diagram illustrating an example of a screen for specifying the size of an extraction segment and storing a moving picture of this segment in a file. An area 701 in FIG. 7 allows a user to specify a file size and corresponds to the limit-capacity specifying processor 603. A button 702 is one that allows the user to specify storage of a file of the extraction segment and corresponds to the extraction-segment storage specifying unit 601.

When the user launches an application for handling moving pictures at the client and selects a moving picture file desired to be uploaded, the display screen of the image display unit 7 is caused to shift to an upload screen in a manner similar to that of the first embodiment. If the user then specifies the size of an extraction segment to be extracted from this moving picture file, the limit-capacity acquisition processor 1 acquires the size from the limit-capacity specifying processor 603 and displays it on the upload screen. Next, as described above with reference to FIGS. 5A, 5B, the user specifies the desired extraction segment from the selected moving picture file and presses the segment playback button to play back the moving picture of this extraction segment. If the moving picture played back is as desired, then a file save button 702 is pressed and the extraction-segment file storage unit 602 stores the moving picture of this extraction segment as a moving picture file.

In accordance with the second embodiment as described above, the user can specify the size of the moving picture file, extract the portion of the moving picture having the specified size and store it as a moving picture file.

Third Embodiment

A third embodiment of the present invention will now be described with reference to the drawings. In the first and second embodiments, a case where the VBR is adopted as the encoding scheme of a moving picture file is taken as an example. The third embodiment, however, is described with regard to a case where CBR (Constant Bit Rate) is adopted to perform compression in such a manner that data size will be constant at all times.

Figure 8:
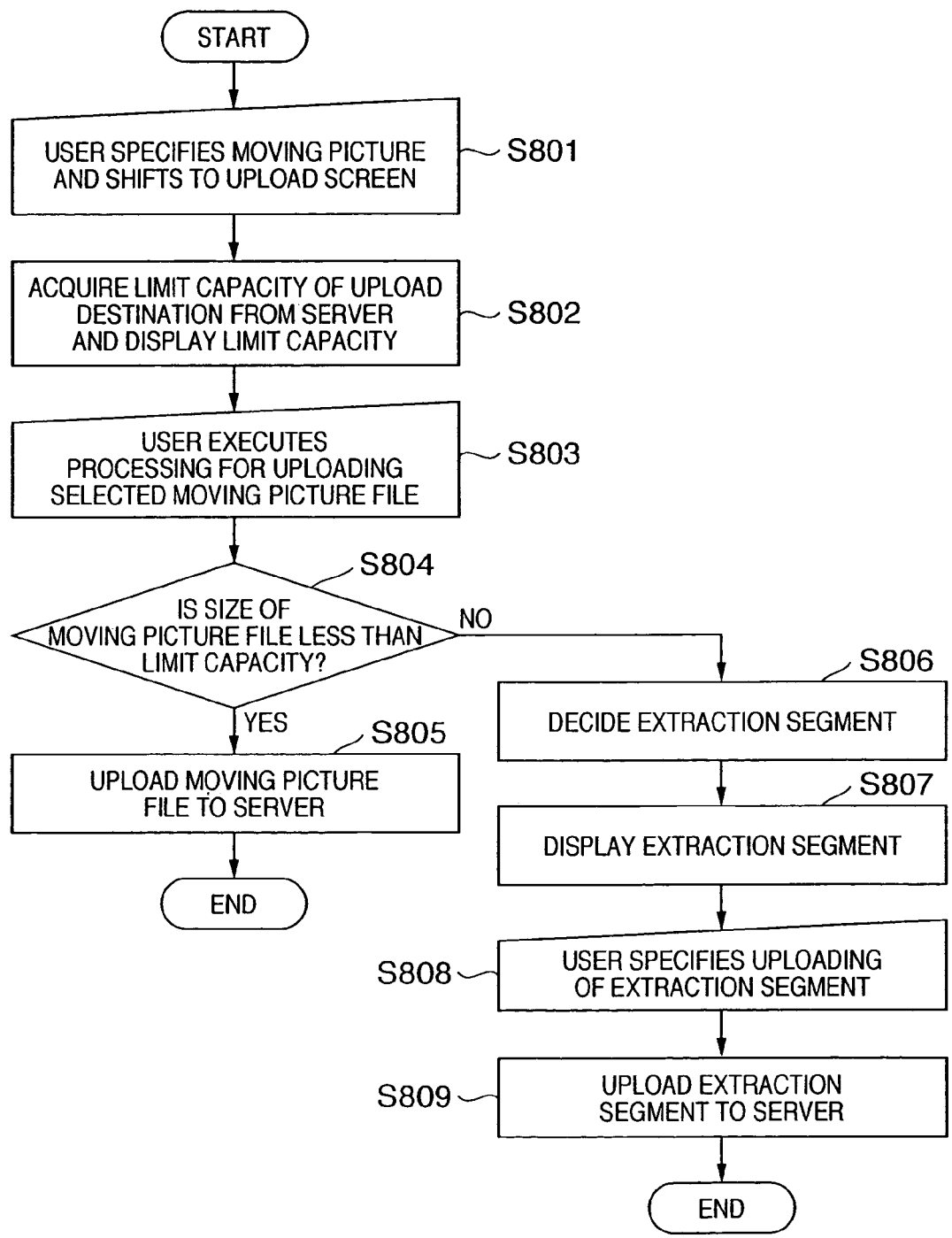
FIG. 8 is a flowchart illustrating an example of processing executed by the client.

FIG. 8 is a flowchart illustrating an example of processing executed by the client according to the third embodiment.

At step S801, the user launches an application for handling moving pictures at the client and selects a moving picture file desired to be uploaded to the server, whereupon the display screen of the image display unit 7 is caused to shift to an upload screen. Next, at step S802, the limit-capacity acquisition processor 1 acquires from the server the limit capacity of an uploadable moving picture file and displays it on the upload screen. Specifically, the limit-capacity acquisition processor 1 issues a request to the limit-capacity transmitting processor 15 of the server and acquires the limit capacity as the response. At the server, meanwhile, the limit-capacity transmitting processor 15 requests the limit capacity from the limit-capacity deciding processor 14, and the limit-capacity deciding processor 14 responds by deciding the limit capacity based upon the amount of data in the database 12 and reports this to the limit-capacity transmitting processor 15.

Next, when the user specifies uploading of the selected moving picture file at step S803, it is determined at step S804 whether the size of this moving picture file is less than the limit capacity acquired at step S802. If the size of the moving picture file is smaller, control proceeds to step S805, where the selected moving picture file is uploaded to the server.

Further, if the size of the selected moving picture file is greater than the limit capacity, control proceeds to step S806. Here the extraction-segment deciding processor 3 decides the extraction segment in such a manner that it will fall within the limit capacity. Further, the information of the extraction segment decided by the extraction-segment deciding processor 3 is held in the extraction-segment information holding unit 6.

Next, at step S807, the extraction segment decided at step S806 is displayed on the extraction-segment display unit 4 and it is so arranged that the user can edit the extraction segment. The user operates a pointing device to move the extraction segment, which is displayed on the extraction-segment display unit 4, to the left and right, whereby the user can select editing of the extraction segment.

Further, if the user wishes to make the size of the uploaded moving picture file smaller than the extraction segment displayed on the extraction-segment display unit 4, then the user operates the pointing device at step S807, whereby the user can reduce the size of the extraction segment displayed on the extraction-segment display unit 4. If the size of the extraction segment has been reduced, then the information of the extraction segment held in the extraction-segment information holding unit 6 is updated by the information of the reduced extraction segment.

Control then proceeds to step S808, where the user specifies uploading of the moving picture file of the extraction segment. This processing is executed by the extraction-segment upload designating unit 10. Then, at step S808, the moving picture file of the extraction segment is uploaded to the server based upon the information being held in the extraction-segment information holding unit 6 and selected moving picture holding unit 5. This processing is executed by the extraction-segment upload processor 11. Further, as a result of the processing at step S809, the moving picture of the extraction segment is transferred to the moving picture registration processor 13, where the moving picture is registered in the database 12.

In accordance with the third embodiment as described above, if the size of a moving picture file exceeds the limit capacity of a server when a user uploads the moving picture to the server, the user merely specifies the position of the extraction segment of a fixed size, whereby the user can simply extract a moving picture having a size that will fall within the limit capacity of the server.

The configuration of a computer for implementing the server or client of the first to third embodiments will be described with reference to the block diagram of FIG. 9. The server or client may each be implemented by a simple computer or by dispersing the functions among a plurality of computers according to need. In a case where implementation is by a plurality of computers, the computers would be connected as by a LAN (Local Area Network) so as to be capable of communicating with one another.

Figure 9:
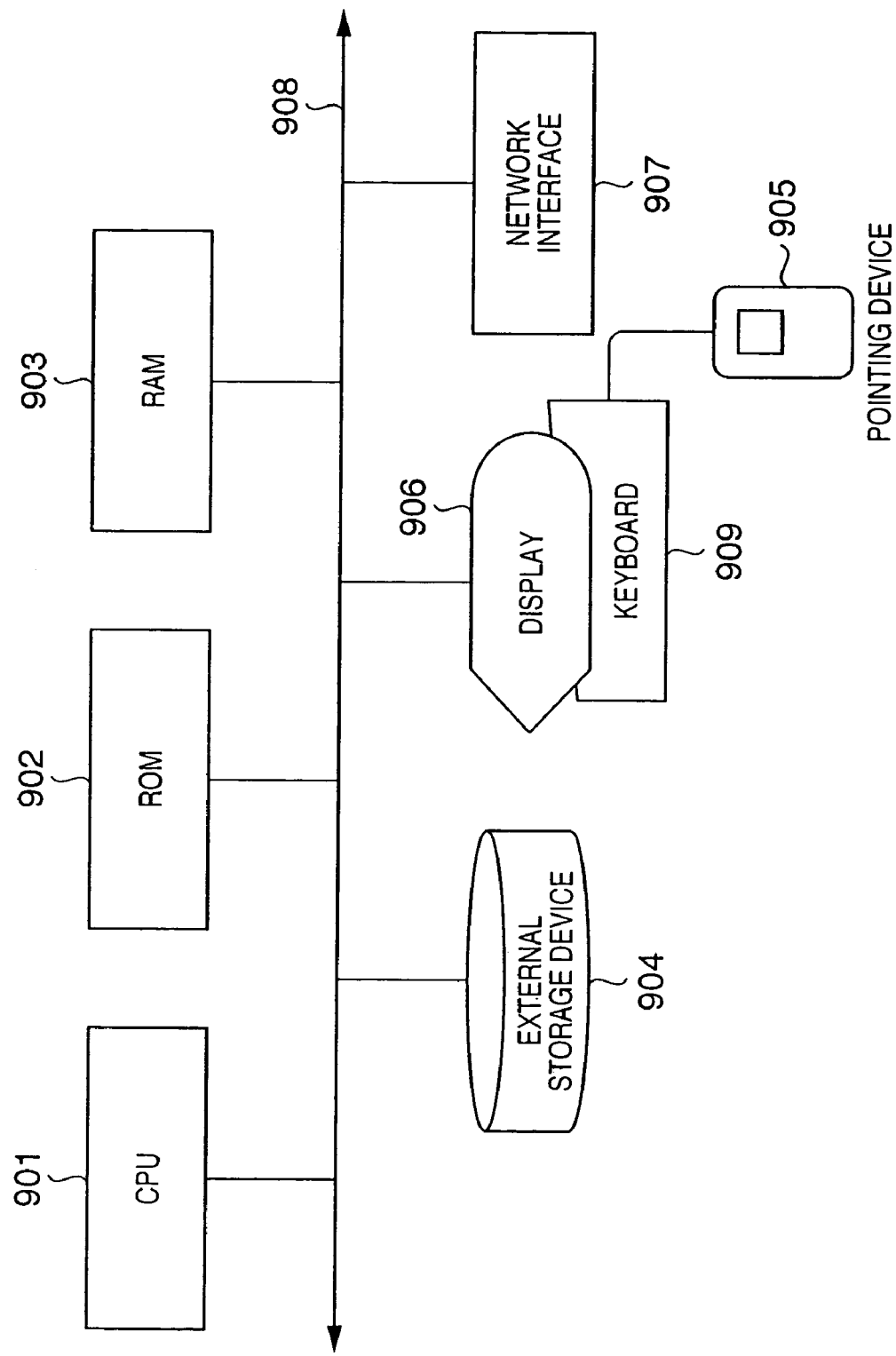
FIG. 9 is a block diagram illustrating an example of the configuration of a computer.

Shown in FIG. 9 are a CPU (Central Processing Unit) 901 for overall control of a computer 900; a ROM (Read-Only Memory) 902 for storing programs and parameters that do not require changing; a RAM (Random-Access Memory) 903 for temporarily storing programs or data supplied from an external apparatus; an external storage device 904 inclusive of a hard disk or memory card permanently installed in a computer 900 or removable media such as a floppy disk (FD), an optical disk such as a compact disk (CD), a magnetic or optical card, IC card or memory card; an interface 905 for interfacing an input device such as a pointing device or keyboard 909 operated by the user for inputting data; an interface 906 for interfacing a monitor 910 that displays data held by the computer 900 and data that has been supplied; a network interface 907 for connection to a network line such as the Internet 103; and a system bus 908 for connecting the components 901 to 907 so that they can communicate with one another.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes.

In this case, the program codes read from the storage medium implement the novel functions of the embodiments and the storage medium storing the program codes constitutes the invention.

Examples of storage media that can be used for supplying the program code are a floppy disk, hard disk, optical disk, magneto-optical disk, CD-ROM, CD-R, magnetic tape, non-volatile type memory card or ROM.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiments.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Applications No. 2003-317321 filed on Sep. 9, 2003 and No. 2004-245688 filed on Aug. 25, 2004 which are hereby incorporated by reference herein.

What is claimed is:

1. A method of extracting moving pictures in an information processing apparatus for extracting a moving picture of a desired size from a moving picture file, comprising:

an acquisition step of acquiring size of a moving picture;

a decision step of deciding an extraction segment of a moving picture to be extracted from a moving picture file, based upon the size acquired at said acquisition step; and an extraction step of extracting the moving picture of the extraction segment, which has been decided at said decision step, from the moving picture file.

2. The method according to claim 1, wherein the size of a moving picture is acquired from a server that manages moving pictures on the Internet.

3. The method according to claim 1, further comprising a step of uploading the moving picture, which has been extracted at said extraction step, to a server that manages moving pictures on the Internet.

4. The method according to claim 1, wherein the extraction segment of a moving picture to be extracted is decided at said decision step using a moving-picture starting point as a reference.

5. The method according to claim 1, wherein said decision step includes:

a starting-point specifying step of specifying a starting point of the extraction segment of the moving picture; and an end-point specifying step of specifying an end point of the extraction segment of the moving picture based upon the starting point specified at said starting-point specifying step and the size acquired at said acquisition step.

6. The method according to claim 1, further comprising:

a generation step of generating a user interface showing the size acquired in said acquisition step, wherein the user interface to be generated in said generation step is used in said decision step.

7. A moving picture extraction apparatus for extracting for extracting a moving picture of a desired size from a moving picture file, comprising:

acquisition means for acquiring size of a moving picture;

decision means for deciding an extraction segment of a moving picture to be extracted from a moving picture file, based upon the size acquired by said acquisition means; and extraction means for extracting the moving picture of the extraction segment, which has been decided by said decision means, from the moving picture file.

8. A moving picture system comprising a client apparatus for extracting a moving picture of a desired size from a moving picture file, and a server apparatus for managing moving pictures, wherein said client apparatus includes:

(a) acquisition means for acquiring size of a moving picture;

(b) decision means for deciding an extraction segment of a moving picture to be extracted from a moving picture file, based upon the size acquired by said acquisition means;

(c) extraction means for extracting the moving picture of the extraction segment, which has been decided by said decision means, from the moving picture file; and (d) means for uploading the moving picture, which has been extracted by said extraction means, to said server, and wherein said server apparatus includes management means for managing a moving picture that has been uploaded from said client apparatus.

9. A computer-readable recording medium storing a computer program for causing a computer to execute a method of extracting moving pictures as an information processing apparatus, said method comprising:

an acquisition step of acquiring size of a moving picture;

a decision step of deciding an extraction segment of a moving picture to be extracted from a moving picture file, based upon the size acquired at said acquisition step; and an extraction step of extracting the moving picture of the extraction segment, which has been decided at said decision step, from the moving picture file.

10. The apparatus according to claim 7, wherein the size of a moving picture is acquired from a server that manages moving pictures on the Internet.

11. The apparatus according to claim 7, further comprising means for uploading the moving picture, which has been extracted by said extraction means, to a server that manages moving pictures on the Internet.

12. The apparatus according to claim 7, wherein the extraction segment of a moving picture to be extracted is decided by said decision means using a moving-picture starting point as a reference.

13. The apparatus according to claim 7, wherein said decision means includes:

starting-point specifying means for specifying a starting point of the extraction segment of the moving picture; and end-point specifying means for specifying an end point of the extraction segment of the moving picture based upon the starting point specified by said starting-point specifying means and the size acquired by said acquisition means.

14. The apparatus according to claim 7, further comprising:

generation means for generating a user interface showing the size acquired by said acquisition means, wherein the user interface to be generated by said generation means is used by said decision means.

* * * * *

UNITED STATES PATENT AND TRADEMARK OFFICE
CERTIFICATE OF CORRECTION

PATENT NO. : 7,403,655 B2 Page 1 of 1
APPLICATION NO. : 10/934527
DATED : July 22, 2008
INVENTOR(S) : Shinji Yamashita It is certified that error appears in the above-identified patent and that said Letters Patent is hereby corrected as shown below:

<u>COLUMN 1</u>
      Line 62, "for extracting" (second occurrence) should be deleted.

<u>COLUMN 9</u>
      Line 45, "for extracting" should be deleted.

Signed and Sealed this

Sixteenth Day of December, 2008

JON W. DUDAS
*Director of the United States Patent and Trademark Office*